UNITED STATES PATENT OFFICE.

LEON LILIENFELD, OF VIENNA, AUSTRIA-HUNGARY.

PROCESS FOR THE MANUFACTURE OF DIETHYL SULFATE.

1,074,633. Specification of Letters Patent. Patented Oct. 7, 1913.

No Drawing. Application filed May 20, 1913. Serial No. 768,702.

*To all whom it may concern:*

Be it known that I, LEON LILIENFELD, a subject of the Emperor of Austria-Hungary, residing at No. 1 Zeltgasse, Vienna, VIII, in the Empire of Austria-Hungary, have invented certain new and useful Improvements in the Process for the Manufacture of Diethyl Sulfate, of which the following is a specification.

This invention has for its object to provide an improved process for the manufacture of di-ethyl sulfate.

The processes proposed hitherto for the manufacture of di-ethyl sulfate have all had the drawback of giving an insufficient yield. The best of the proposed processes which is described in the specification of German Patent No. 133,542 gives, according to the said specification, yields of 41 to 47 per cent. of the theoretical quantity.

I have now discovered that di-ethyl sulfate may be manufactured on an industrial scale and a considerably higher yield, not much below the theoretical yield, of di-ethyl sulfate may be obtained on an industrial scale, by the distillation *in vacuo* of sodium ethyl sulfate.

In carrying the invention into effect sodium ethyl sulfate alone or mixed with any suitable diluting agent for instance dry sulfate of soda, is heated, if necessary, with stirring, in a vacuum, and the di-ethyl sulfate which distils over is collected in the usual manner in a suitable receiver. The resulting di-ethyl sulfate, if desired, may be further subjected to any known purifying process.

The following is an example of one way of carrying out the improved process.

Example: 4000 grams of sodium ethyl sulfate free from water of crystallization are distilled *in vacuo*. The di-ethyl sulfate which has distilled over is mixed with cold water and extracted with chloroform. The chloroform solution is drawn off, dried with calcium chlorid, filtered off from the calcium chlorid and the chloroform driven off. The residue consisting of pure di-ethyl sulfate weighs about from 1720 to 1870 grams. Consequently the yield of pure di-ethyl sulfate amounts to 83 to 90 per cent. of the theoretical yield, and will probably be much higher when dealing with large quantities and using specially designed apparatus.

The combustion of a sample of di-ethyl sulfate produced according to the improved process gave the following results:—0.2420 grams of the substance yielded (*a*) 0.1479 grams of $H_2O$—6.78 per cent. of H.; (*b*) 0.2772 grams of $CO_2$,—31.23 per cent. of C. Calculated for di-ethyl sulfate H=6.48 per cent., C=31.12 per cent.

What I claim is:—

1. A process for the manufacture of di-ethyl sulfate, which consists in subjecting sodium ethyl sulfate to distillation in a vacuum.

2. A process for the manufacture of di-ethyl sulfate, which consists in distilling *in vacuo* sodium ethyl sulfate in mixture with a suitable diluting agent.

In testimony whereof I affix my signature in presence of two witnesses.

LEON LILIENFELD.

Witnesses:
HERMAN WUNDERLICH,
FRANZ REITER.